(12) United States Patent
Brogelli

(10) Patent No.: US 10,962,022 B2
(45) Date of Patent: Mar. 30, 2021

(54) DIAPHRAGM FOR A CENTRIFUGAL COMPRESSOR

(71) Applicant: Nuovo Pignone Tecnologie—S.r.l., Florence (IT)

(72) Inventor: Riccardo Brogelli, Florence (IT)

(73) Assignee: NUOVO PIGNONE TECNOLOGIE—S.R.L., Florence (IT)

( * ) Notice: Subject to any disclaimer, the term of this patent is extended or adjusted under 35 U.S.C. 154(b) by 96 days.

(21) Appl. No.: 16/344,380

(22) PCT Filed: Oct. 18, 2017

(86) PCT No.: PCT/EP2017/076583
§ 371 (c)(1),
(2) Date: Apr. 24, 2019

(87) PCT Pub. No.: WO2018/077691
PCT Pub. Date: May 3, 2018

(65) Prior Publication Data
US 2020/0049158 A1    Feb. 13, 2020

(30) Foreign Application Priority Data

Oct. 24, 2016  (IT) .......................... 102016000106889

(51) Int. Cl.
| | | |
|---|---|---|
| *F04D 29/44* | (2006.01) |
| *F04D 29/28* | (2006.01) |
| *F04D 29/16* | (2006.01) |
| *F16J 15/16* | (2006.01) |
| *F04D 29/68* | (2006.01) |

(52) U.S. Cl.
CPC ......... *F04D 29/284* (2013.01); *F04D 29/162* (2013.01); *F04D 29/441* (2013.01); *F04D 29/682* (2013.01); *F04D 29/684* (2013.01); *F16J 15/16* (2013.01)

(58) Field of Classification Search
CPC .. F04D 29/4206; F04D 29/441; F04D 29/162; F04D 29/682; F04D 29/684; F16J 15/16
See application file for complete search history.

(56) References Cited

U.S. PATENT DOCUMENTS 2,656,096 A * 10/1953 Schwarz ............. F04D 27/0238
                                                                    417/323
3,901,620 A *  8/1975 Boyce ..................... F04D 27/02
                                                                    415/1

(Continued)

FOREIGN PATENT DOCUMENTS

| CN | 101012837 A | 8/2007 |
| CN | 100451345 C | 1/2009 |

(Continued)

*Primary Examiner* — Ninh H. Nguyen
(74) *Attorney, Agent, or Firm* — Baker Hughes Patent Org.

(57) ABSTRACT

A diaphragm 1 for a centrifugal compressor having a rear surface 2 configured to at least partly face an impeller 3, the rear surface 2 having a first portion 2a defining at least in part a diffuser 4 and a second portion 2b facing the impeller 3; the diaphragm has a duct 5 provided with an inlet 6 and an outlet 7, the outlet 7 being located on the second portion 2b of the rear surface 2, the inlet 6 being located on the rear surface 2 at a point where the static pressure is higher with respect to the static pressure at the outlet 7.

9 Claims, 6 Drawing Sheets

(56) References Cited

U.S. PATENT DOCUMENTS

| | | | | |
|---|---|---|---|---|
| 8,287,233 | B2* | 10/2012 | Chen | .................... F04D 29/4213 |
| | | | | 415/58.4 |
| 9,334,866 | B2* | 5/2016 | Gilarranz | ................ F04D 13/06 |
| 2007/0224032 | A1 | 9/2007 | Gu | |
| 2014/0286761 | A1* | 9/2014 | Kim | ...................... F04D 29/162 |
| | | | | 415/173.1 |
| 2017/0261001 | A1* | 9/2017 | Masutani | .............. F04D 29/284 |

FOREIGN PATENT DOCUMENTS

| | | | |
|---|---|---|---|
| EP | 2615338 | A1 | 7/2013 |
| JP | 6153500 | A | 3/1986 |
| JP | 2003148397 | A | 5/2003 |
| JP | 2007177737 | A | 7/2007 |
| JP | 2012057726 | A | 3/2012 |
| WO | 2014074432 | A1 | 5/2014 |
| WO | 2018077691 | A1 | 5/2018 |

* cited by examiner

US 10,962,022 B2

DIAPHRAGM FOR A CENTRIFUGAL COMPRESSOR

TECHNICAL FIELD

The subject matter of the present disclosure relates to a diaphragm for a centrifugal compressor.

BACKGROUND OF THE INVENTION

A compressor is a machine which accelerates the particles of a compressible fluid, e.g., a gas, through the use of mechanical energy to increase the pressure of that compressible fluid. Compressors are used in a number of different applications, including operating as an initial stage of a gas turbine engine. Among the various types of compressors are the so-called centrifugal compressors, in which the mechanical energy operates on gas input to the compressor by way of centrifugal acceleration which accelerates the gas particles, e.g., by rotating a centrifugal impeller through which the gas is passing. More generally, centrifugal compressors are part of a class of machinery known as "turbo machines" or "turbo rotating machines".

Centrifugal compressors can be fitted with a single impeller, i.e., a single stage configuration, or with a plurality of impellers in series, in which case they are frequently referred to as multistage compressors. Each of the stages of a centrifugal compressor typically includes an inlet conduit for gas to be accelerated, an impeller which is capable of providing kinetic energy to the input gas and a diffuser which converts the kinetic energy of the gas leaving the impeller into pressure energy. Impellers can be shrouded or unshrouded. The present disclosure refers to shrouded impellers.

The compressor also comprises one or more balance drums, namely elements that generates opposite and balancing trust respect to the overall one generated by the impellers, and by a thrust bearing, namely an element that compensates the residual axial thrust. Both these elements are generally attached to the shaft.

With more detail, a centrifugal compressor stage comprises both rotating and static components. The static components separate zones at different pressure level. Indeed, a variable number of static diaphragms are placed between the impellers, between the inlet plenum and the first impeller or after the last one, and are fixed to the casing. The diaphragms define, among themselves, ducts that channel the working fluid between the impellers. Therefore the shape of the diaphragms affects considerably the fluid dynamics inside the compressor.

With more detail, the diaphragm has a rear surface which partly faces the front surface of an impeller. Also, the diaphragm has a front surface that partly faces the rear surface of another impeller or the inlet plenum if it is in front of the first impeller. It is to be noted that, according to the present disclosure, the term "diaphragm" designates all of the possible structural components that can take the place of a diaphragm, for example inner casing or casing that combine the structural and channeling role. More generally, the term diaphragm designates any of the statoric components of the compressor which are either between impellers, in front of the impeller of the first stage or behind the impeller of the last stage.

A problem which is relevant in the state of the art is the behavior of the working fluid in the gap between the impeller shroud and the diaphragm. In this area the fluid generates a flow from the exit (high pressure) to the inlet (low pressure) of the impeller. In other words, there is a recirculation of working fluid across the impeller shroud. A seal placed on the impeller eye, namely the lower diameter of the external side of the shroud, has the purpose to limit such recirculation.

Seals can be used between certain rotating and static elements to reduce undesirable leakage within the centrifugal compressor. For example, labyrinth seals or honeycomb seals can be used as internal seals at, for example, a balance piston and an impeller eye (or each impeller eye in a multi-stage centrifugal compressor). Generally, labyrinth seals use grooves and lands to provide a difficult flow path for a fluid, while honeycomb seals use hexagonal shaped cells to resist the flow of the fluid. Both types of seals allow for a small gap (or an equivalent feature) between a rotating surface and a static surface. Various seal designs have been implemented since the inception of turbo machines.

Since the fluid flowing in the diaphragm/shroud gap has passed through the rotating vanes of the impeller it has a velocity with a tangential component, called "swirl" in the technical field, which has the same rotation sense of the impeller.

This flow generates several undesirable effects. Specifically, the swirled flow produces a radial pressure gradient on the external surface of the shroud that increases the natural axial trust of the impeller towards its inlet. This leads to an increment of the size of the balance drum and of the thrust bearing size. Both these actions increase the required adsorbed power of the compressor.

Also, the swirl reduces the rotor-dynamic stability (measured as logarithmic decrement) of the compressor potentially till negative values. In this extreme case the compressor cannot operate.

The swirl is sometime reduced with devices known as "swirl brakes". These are small winglets that reduce the swirl at the inlet of the seal on the impeller eye.

The swirl brakes effectiveness has some limit, so the problem is reduced but not eliminated.

BRIEF DESCRIPTION OF THE INVENTION

Given the above state of the art, the inventor has developed a new and improved version of a diaphragm for a centrifugal compressor, which will be illustrated by describing several embodiments by the way of example. It is to be noted that many more variations of such embodiments will be apparent by the attached, non-limiting description.

A first embodiment of the invention therefore relates to a diaphragm for a centrifugal compressor. Such diaphragm has a central axis.

The diaphragm also has a rear surface configured to at least partly face an impeller. The rear surface has a first portion defining at least in part a diffuser and facing a further diaphragm. The rear surface has a second portion facing the impeller.

The diaphragm has a duct having an inlet and an outlet. The inlet and the outlet are located on the second portion. Indeed, the inlet is located on the rear surface at a point where the static pressure is higher with respect to the static pressure at the outlet.

A further embodiment of the invention relates to a method for reducing a flow swirl around an impeller of a centrifugal compressor. The method comprises the step of transferring a portion of working fluid from a first location to a second location near the impeller. The first location has a higher static pressure than the second location.

BRIEF DESCRIPTION OF THE DRAWINGS

Further details and specific embodiments will refer to the attached drawings, in which.

DETAILED DESCRIPTION OF THE INVENTION

The following description of exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

With reference to the attached drawings, with the number 1 is indicated a diaphragm for a centrifugal compressor. A diaphragm-impeller assembly will be indicated with the number 17.

Figure 1:
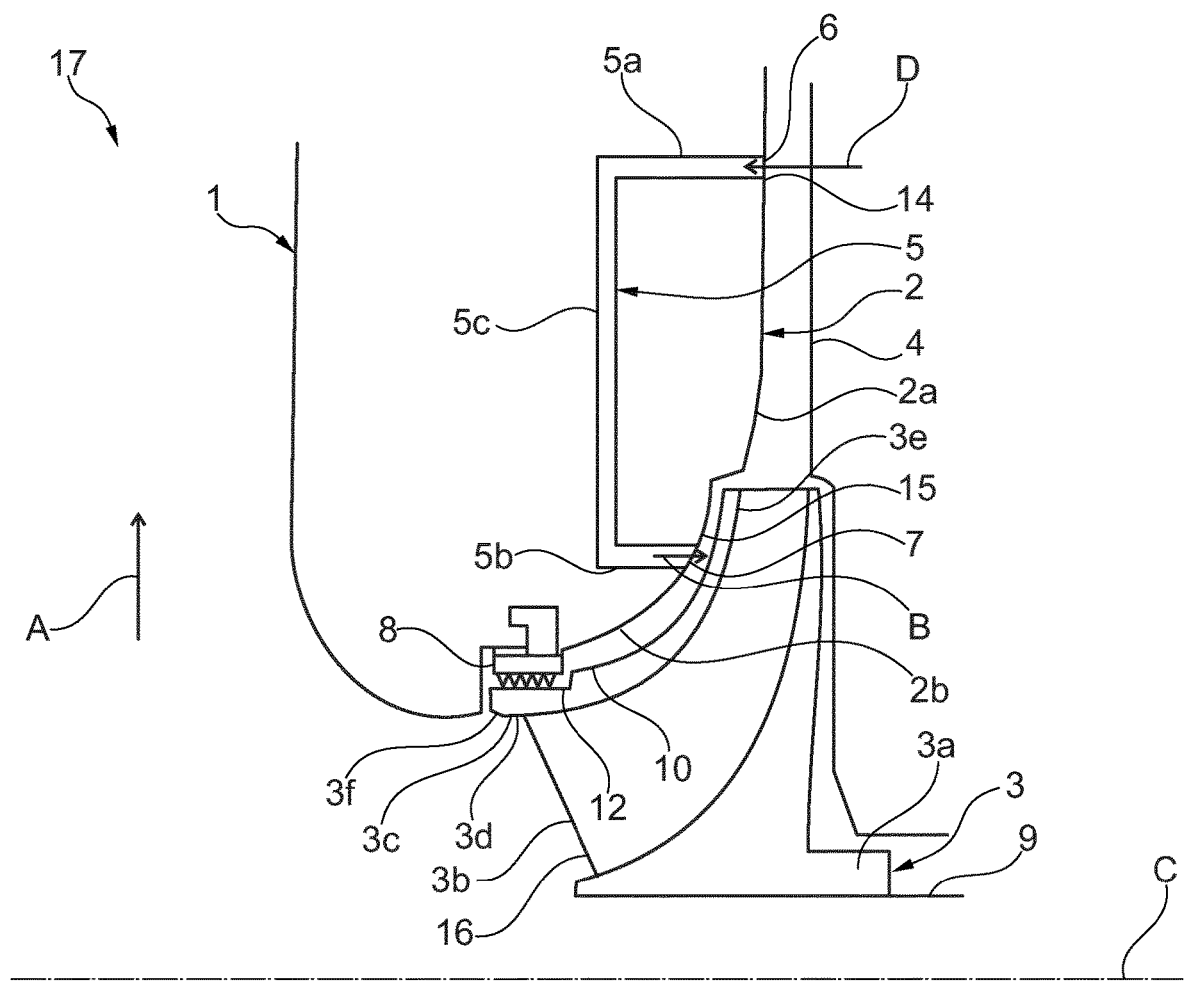
FIG. 1 is a schematic lateral sectional view of a diaphragm according to a first embodiment of the present invention.

As shown schematically in FIG. 1, the diaphragm has a rear surface 2, which is configured to at least partly face an impeller 3. The diaphragm 1 also has a central axis "C".

The impeller 3 has a hub 3a and a shroud 3c. The shaft 9 is connected to the hub 3a, and provides the power to be transmitted to the fluid.

The impeller 3 also comprises a plurality of blades 16 arranged between the hub 3a and the shroud 3c. Vanes 3b develop outwardly from the hub 3a and are optimally shaped in order to displace the working fluid from an inlet 3d to an outlet 3e at the periphery of the impeller 3. The inlet 3d is in particular placed in a frontal area of the impeller 3. In the technical field the eye 3f of the impeller 3 is defined as the frontal part, typically at minimum diameter, of the shroud. The shroud 3c is attached to the blades 16, opposite with respect to the hub 3a. It is to be noted that the diaphragm 1 faces the shroud 3c of the impeller 3 and it interacts with it in a way that will be clear in a following portion of the present disclosure. The impeller 3, being of the conventional kind, is already known to the person skilled in the art and will not be described in further detail.

The impeller 3 also comprises a plurality of blades 16 arranged between the hub 3a and the shroud 3c.

During operation, the working fluid enters in the vanes 3b between the blades 16 and exits energized from the outlet 3e at the tip of the impeller 3. Most part of it continues flowing to a diffuser 4 where part of the kinetic energy is transformed in static pressure. Part of the fluid energized by the rotating blades 16 will recirculate back flowing in a gap 10 between the impeller 3 and diaphragm 1.

With more detail, the rear surface 2 of the diaphragm 1 has a first portion 2a defining at least in part the diffuser 4, and eventually the bend or the discharge scroll (not shown in the drawings). The first portion 2a may also face a further diaphragm 1. The rear surface 2 also has a second portion 2b, which faces the impeller 3, in particular the shroud 3c. The previously mentioned gap 10 is defined between the second portion 2c of the rear surface 2 and the shroud 3b of the impeller 3.

A seal 8, part of the diaphragm-impeller assembly 17, is placed in the gap 10 between the diaphragm 1 and the impeller 3. In particular, the seal 8 is placed between the second portion 2b of the rear surface 2 and the shroud 3c. In other words, the second portion 2b of the rear surface 2 is bounded by the seal 8.

The seal 8 is generally arranged near the eye 3f of the impeller 3. With more detail, a seal surface 12 is defined on the shroud 3c of the impeller 3 in proximity with the eye 3f. With additional detail, the seal surface 12 can be generally smooth, stepped or toothed, and has a central axis substantially coinciding with the central axis "C" of the diaphragm 1. The seal 8 is attached to the rear surface 2 and faces the seal surface 12.

Such seal 8 can be made by different technologies and shapes with rotoric and/or statoric teeth, cells etc., and has the purpose of limiting the back flow of the working fluid around the impeller 3. One particularly advantageous embodiment of the seal 8 is outlined in the patent application EP2737179A1, by the same Applicant. Regardless of the presence of the seal 8, some back flow of working fluid will nevertheless be present.

As shown in FIGS. 1, 2, 3, 5 and 6, the diaphragm 1 has a duct 5. The duct 5 has an inlet 6 and an outlet 7 for the process fluid. The outlet 7 is located on the second portion 2b of the rear surface 2. The inlet 6, on the other hand, is located on the rear surface 2 at a point where the static pressure is higher with respect to the static pressure at the outlet 7. Therefore, a portion of the working fluid is redirected inside the duct 5 and will exit in the gap 10.

Figure 2:
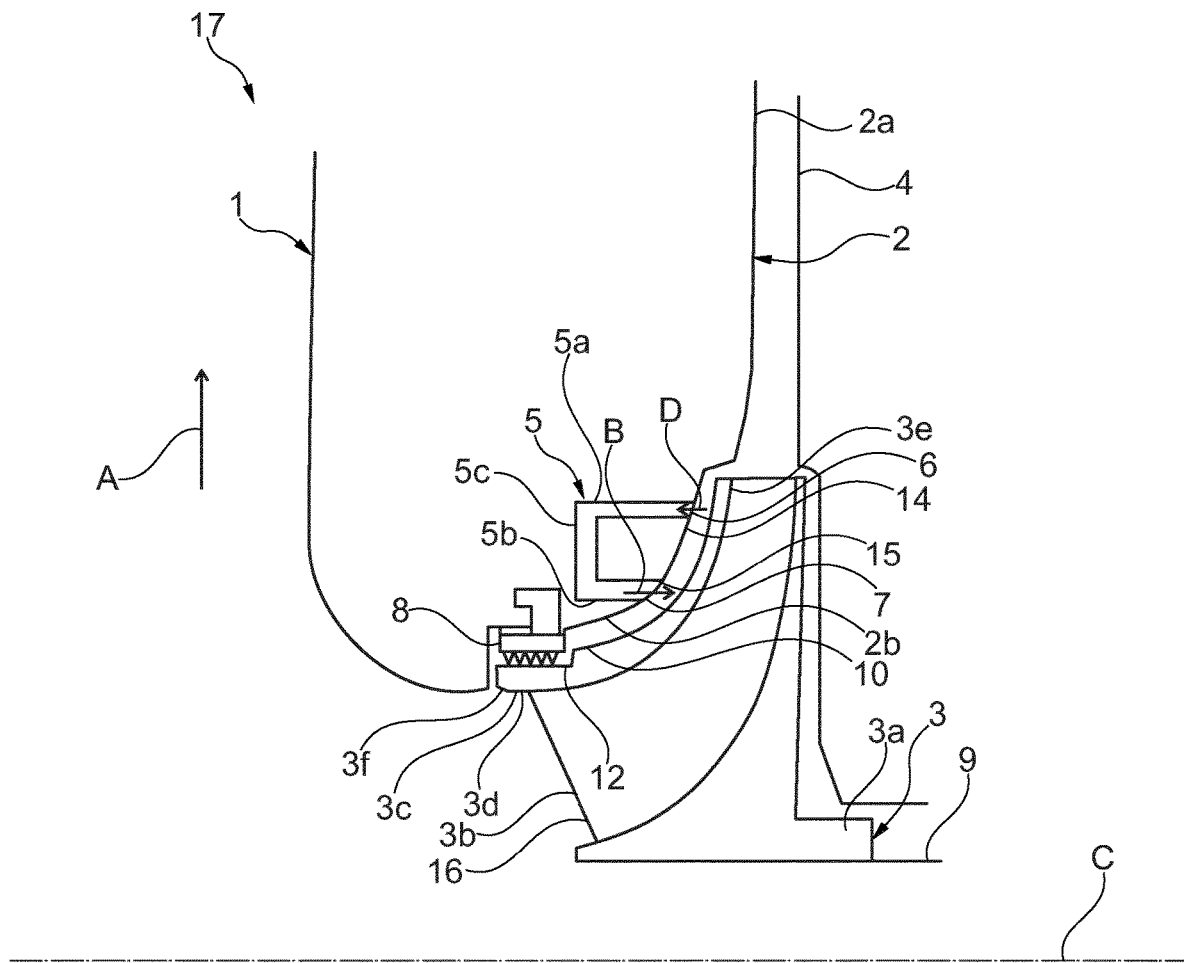
FIG. 2 is a schematic lateral sectional view of a diaphragm according to a second embodiment of the present invention.
Figure 6:
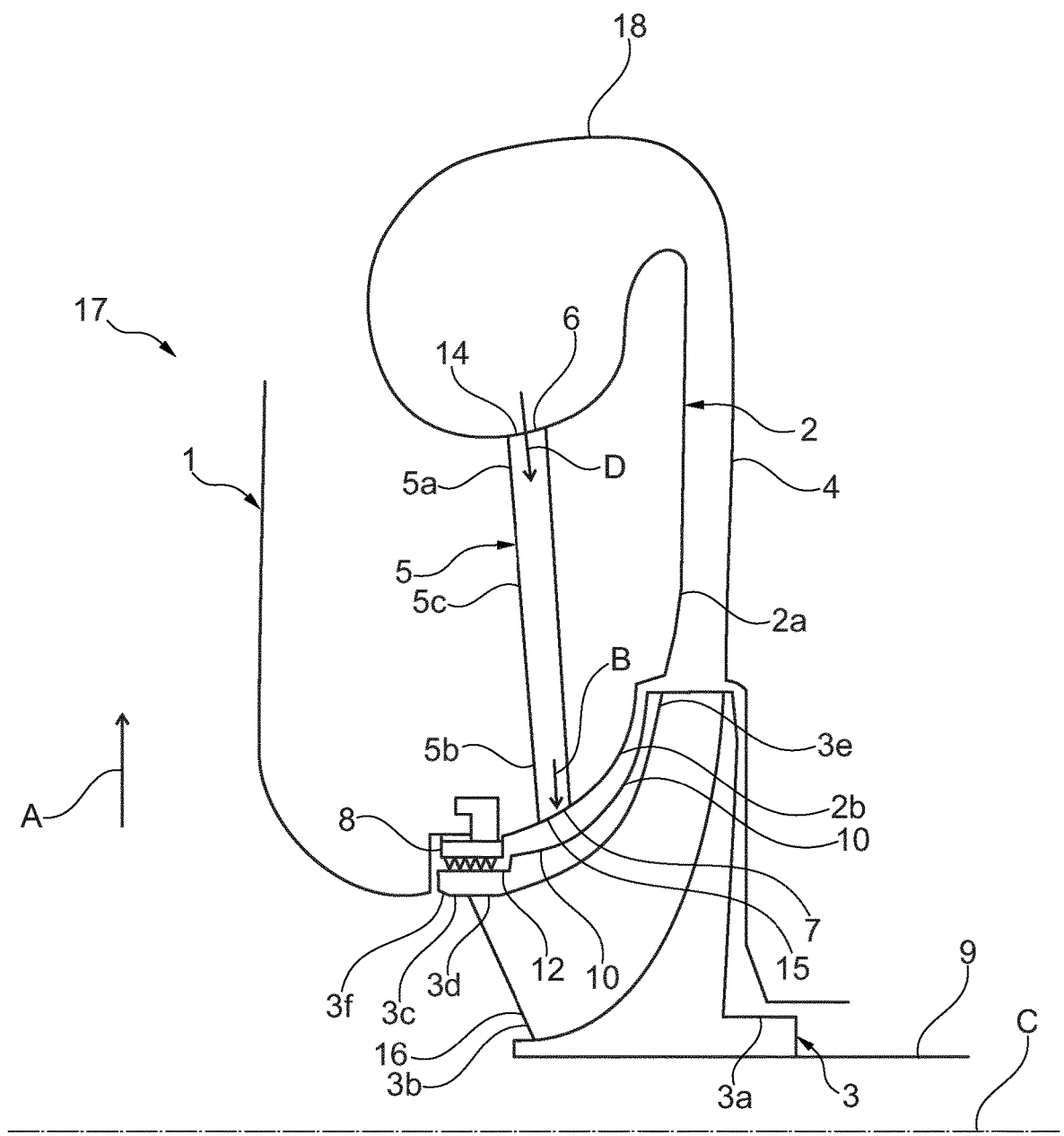
FIG. 6 is a schematic lateral sectional view of a diaphragm according to a fifth embodiment of the present invention.

In the embodiment shown in FIG. 1, the inlet 6 can be located on the first portion 2a of the rear surface 2. Alternatively, as shown in FIG. 2, the inlet 6 can be located on the second portion 2b of the rear surface 2. Also, as shown in FIG. 6, the inlet 6 can be placed even on a scroll 18 of the compressor.

Figure 5:
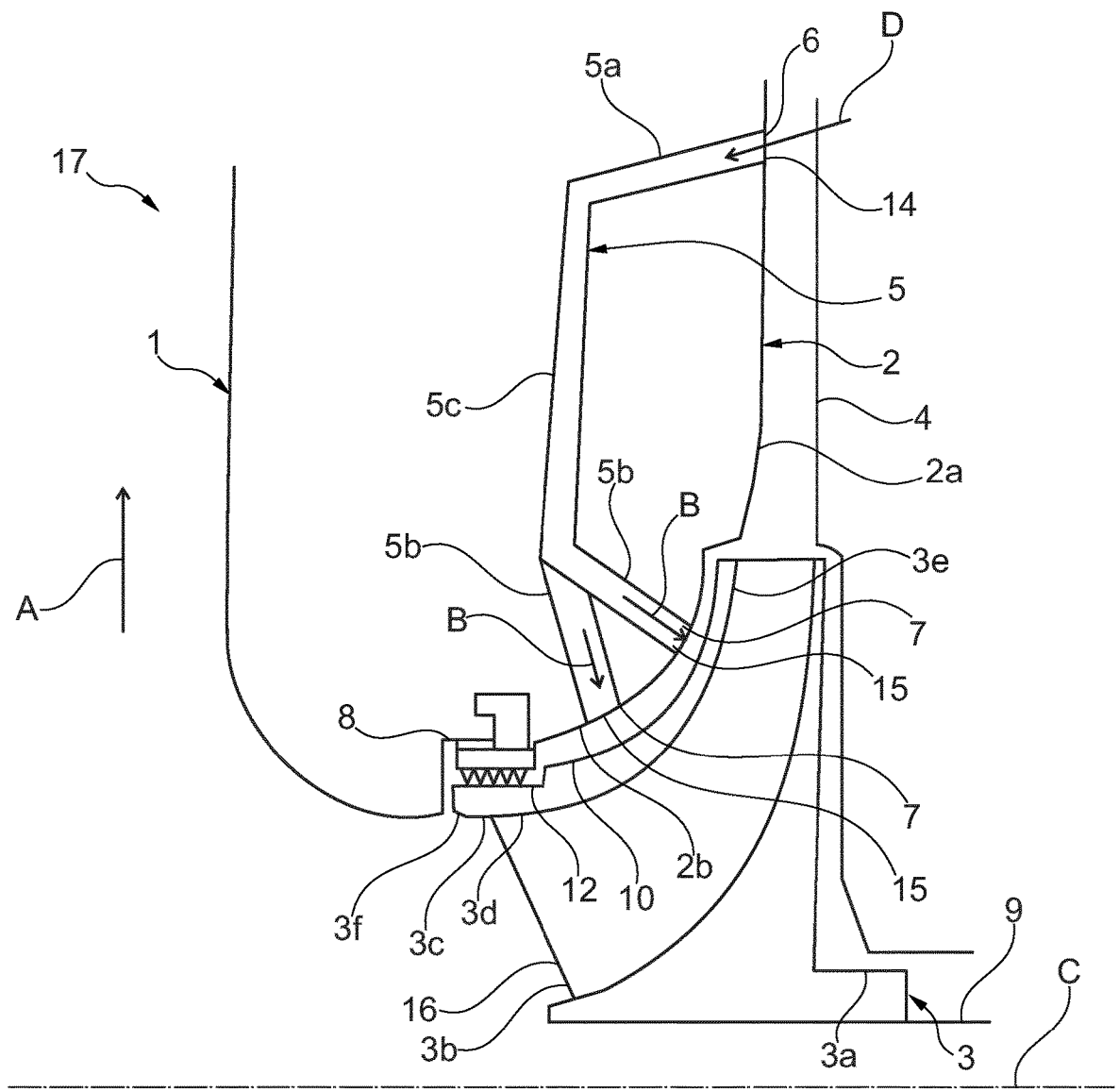
FIG. 5 is a schematic lateral sectional view of a diaphragm according to a fourth embodiment of the present invention.

The duct 5 comprises a first portion 5a which develops from the inlet 6, in particular transversally with respect to a radial direction "A". The duct 5 comprises a second portion 5b which develops from the outlet 7, in particular transversally with respect to the radial direction "A". Also, an intermediate portion 5c joins the first 5a and the second portion 5b. The intermediate portion 5c develops at least partially along the radial direction "A". It is to be noted that there can be multiple branches of the duct 5, as shown in FIG. 5, in which the duct 5 comprises multiple second portions 5b, each leading to a respective outlet 7.

In a preferred embodiment, the second portion 5b of the duct 5 is arranged so that the flow at the outlet 7 of the duct 5 has a tangential velocity opposite to the tangential velocity of the flow on a surface of the impeller 3 which faces the outlet 7. In any case, the tangential velocity is much lower than the one of the impeller 3 at the same diameter or even opposite to it. In other words, the second portion 5b of the duct 5 will be shaped and oriented so that the fluid will exit with a limited swirl that can be even zero or negative, thus having opposite rotation with respect to the one generated by the impeller 3. Advantageously, this provides an important positive contribution to the rotor-dynamic stability of the compressor.

The second portion 5b of the duct 5 develops substantially along an outlet exit direction "B" which can be inclined with respect to the central axis "C" of the impeller 3 in order to impart the required tangential velocity to the working fluid. The duct 5 can have any shape able to provide fluid from the inlet 7 to the outlet 6.

Advantageously, said duct 5 or at least one of said first 5a and second 5b portions of said duct 5, may be integrated into the seal 8.

Figure 3:
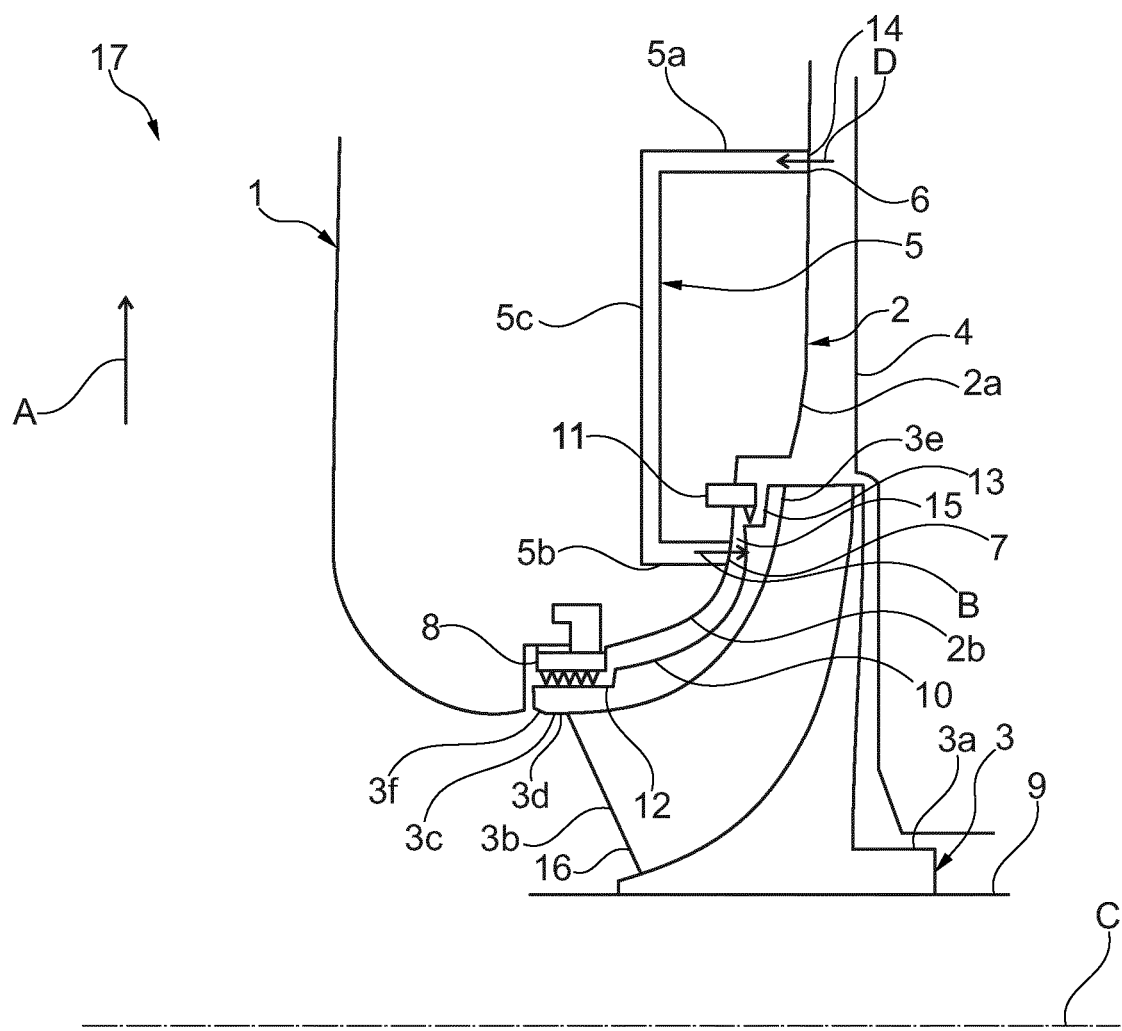
FIG. 3 is a schematic lateral sectional view of a diaphragm according to a third embodiment of the present invention.
Figure 4:
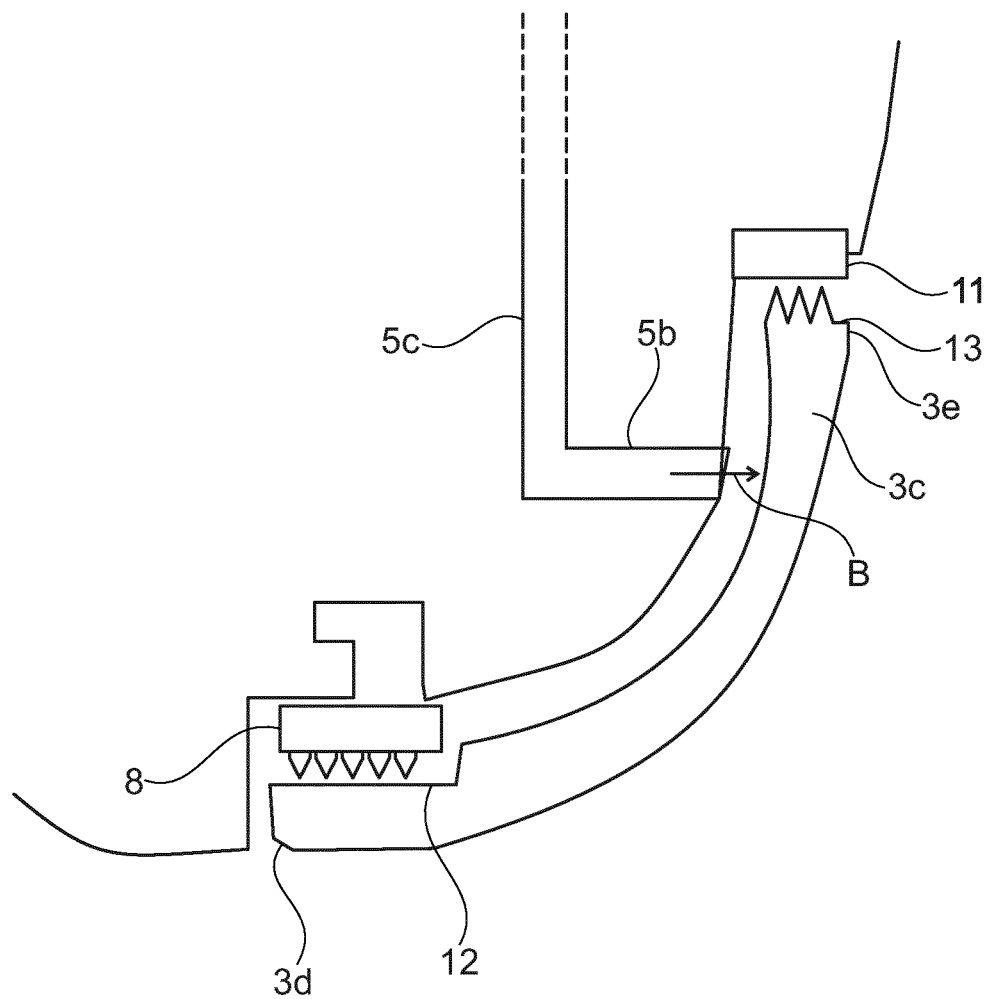
FIG. 4 is a detail view of a variant of the diaphragm of FIG. 3.

Optionally, as shown for example in FIG. 3, the diaphragm-impeller assembly 17 comprises a further seal 11 between the diaphragm 1 and the impeller 3. In particular the further seal is placed between the shroud 3c of the impeller 3 and the second portion 2b of the rear surface 2 of the diaphragm 1. Such further seal is in particular arranged near the outlet 3e of the impeller 3, as shown in FIG. 3. Possibly, the further seal 11 can be arranged on the upper tip of the shroud 3c as shown in FIG. 4. The further seal 11 preferably has a diameter comprised between the one of the seal 8 and the maximum diameter of the shroud 3c. In this case a further seal surface 13, similar to the seal surface 12, is defined on the shroud 3b of the impeller 3.

It is to be noted that, when the further seal 11 is present, the outlet 7 of the duct 5 is placed between the seal 8 and the further seal 11.

Advantageously the further seal 11 limits the back flow from the outlet 7 of the duct 5 toward the outlet 3e of the impeller 3. As consequence, with respect to the solution without the further seal 11, the overall efficiency of the compression stage will be higher and the pressure in the gap 10 will be increased so to generate an axial counter-thrust toward the back of the impeller.

This counter-thrust is opposite in direction respect the thrust normally caused by the operation of the impeller 3, allowing to reduce the centrifugal compressor balance drum (s) seal diameter (s) by limiting the fluid recirculation. Also, this allows to reduce the thrust bearing size. Both these advantages increase the overall efficiency of the compressor.

According to a preferred embodiment of the invention, the diaphragm 1 comprises a plurality of ducts 5. These are preferably angularly uniformly spaced with respect to the central axis "C". The number of the ducts 5 varies depending on the size and on the kind of compressor, but they are generally comprised between 2 and 30.

Ducts can also be not identical one each other.

Also part of the present invention is an embodiment relating to a method for reducing a flow swirl around the impeller 3. The method comprises the step of transferring a portion of working fluid from a first location 14 to a second location 15 near the impeller 3. The first location 14 should have a higher static pressure than the second location 15. As shown above, the first location is defined by the location of the inlet 6 of the duct 5. Similarly, the second location 15 is defined by the location of the outlet 7 of the duct 5.

The invention claimed is:

1. A diaphragm for a centrifugal compressor comprising:
a rear surface configured to at least partly face an impeller having a central axis, said rear surface having a first portion defining at least in part a diffuser and a second portion facing said impeller; and
a duct having an outlet located on said second portion, and an inlet located on the rear surface at a point where the static pressure is higher with respect to the static pressure at the outlet, wherein said inlet is located on the second portion.

2. A diaphragm for a centrifugal compressor comprising:
a rear surface configured to at least partly face an impeller having a central axis, said rear surface having a first portion defining at least in part a diffuser and a second portion facing said impeller; and
a duct comprising an outlet located on said second portion, an inlet located on the rear surface at a point where the static pressure is higher with respect to the static pressure at the outlet, a first portion developing from the inlet, a second portion developing from the outlet and an intermediate portion joining the first and the second portion, said intermediate portion developing at least partially along a radial direction,
wherein said second portion of the duct is arranged so that the flow at the outlet of the duct has a tangential velocity opposite to the tangential velocity of the flow on a surface of the impeller facing the outlet.

3. The diaphragm according to claim 2, wherein said inlet is located on the first portion.

4. A diaphragm-impeller assembly comprising:
a diaphragm according to claim 2; and
an impeller having an inlet and an outlet, said impeller facing at least in part the diaphragm wherein the assembly also comprises a seal on the second portion of the rear surface, said seal arranged in proximity to the inlet of the impeller.

5. The diaphragm-impeller assembly according to claim 4, further comprising an additional seal on the second portion of the rear surface, said additional seal arranged near the outlet of the impeller.

6. The diaphragm-impeller assembly according to claim 5, wherein the outlet of the duct is placed between the seal and the further seal.

7. A centrifugal compressor comprising a plurality of diaphragm-impeller assemblies according to claim 4.

8. A diaphragm for a centrifugal compressor comprising:
a rear surface configured to at least partly face an impeller having a central axis, said rear surface having a first portion defining at least in part a diffuser and a second portion facing said impeller; and
a duct comprising an outlet located on said second portion, an inlet located on the rear surface at a point where the static pressure is higher with respect to the static pressure at the outlet, a first portion developing from the inlet, a second portion developing from the outlet and an intermediate portion joining the first and the second portion, said intermediate portion developing at least partially along a radial direction,
wherein second portion of the duct develops substantially along an outlet exit direction which is inclined with respect to the central axis of the impeller.

9. A diaphragm for a centrifugal compressor comprising:
a rear surface configured to at least partly face an impeller having a central axis, said rear surface having a first portion defining at least in part a diffuser and a second portion facing said impeller; and a plurality of ducts each having a respective outlet located on said second portion, and a respective inlet located on the rear surface at a point where the static pressure is higher with respect to the static pressure at the outlet, wherein the plurality of ducts are angularly uniformly spaced with respect to said central axis.

* * * * *